(12) United States Patent  
Whitney et al.

(10) Patent No.: US 8,291,016 B1  
(45) Date of Patent: Oct. 16, 2012

(54) SYSTEM AND METHOD OF SOCIAL COMMERCE ANALYTICS FOR SOCIAL NETWORKING DATA AND RELATED TRANSACTIONAL DATA

(75) Inventors: Marcus Whitney, Nashville, TN (US); John Baker, Cambridge, MA (US)

(73) Assignee: Moontoast, LLC, Nashville, TN (US)

( * ) Notice: Subject to any disclaimer, the term of this patent is extended or adjusted under 35 U.S.C. 154(b) by 4 days.

(21) Appl. No.: 13/288,447

(22) Filed: Nov. 3, 2011

Related U.S. Application Data

(60) Provisional application No. 61/528,809, filed on Aug. 30, 2011.

(51) Int. Cl.  
*G06F 15/177* (2006.01)

(52) U.S. Cl. .......................... 709/204; 709/224

(58) Field of Classification Search .......... 709/204–207, 709/224  
See application file for complete search history.

(56) References Cited

U.S. PATENT DOCUMENTS

| | | | |
|---|---|---|---|
| 5,974,457 A * | 10/1999 | Waclawsky et al. ......... | 709/224 |
| 2008/0005073 A1 | 1/2008 | Meek et al. | |
| 2008/0162259 A1 | 7/2008 | Patil et al. | |
| 2008/0306830 A1 | 12/2008 | Lasa et al. | |
| 2009/0063284 A1 | 3/2009 | Turpin et al. | |
| 2009/0276263 A1 | 11/2009 | Deb et al. | |
| 2010/0070485 A1 | 3/2010 | Parsons et al. | |
| 2010/0119053 A1 | 5/2010 | Goeldi | |
| 2010/0121849 A1 | 5/2010 | Goeldi | |
| 2011/0093361 A1 | 4/2011 | Morales | |
| 2011/0106610 A1 | 5/2011 | Landis et al. | |
| 2011/0196724 A1 | 8/2011 | Fenton et al. | |
| 2012/0020216 A1 * | 1/2012 | Vashist et al. ................. | 370/235 |

* cited by examiner

*Primary Examiner* — Kenneth R Coulter  
(74) *Attorney, Agent, or Firm* — Waddey & Patterson, P.C.; Edward D. Lanquist, Jr.; Gary L. Montle (57) ABSTRACT

A computer-implemented system and method is provided herein for social commerce analytics and optimization. A hosted platform collects and stores online visitor traffic data from social media platforms and from commercial platforms linked to social media campaigns operating on the social media platforms. Algorithms are executed to establish baseline performance parameters for the commercial platforms based on the stored data, and visitors of the social media campaigns and commercial platforms are identified and scored based on predetermined scoring metrics. The scores are aggregated with respect to the social media campaigns and/or the commercial platforms, and actual performances based on the aggregated scores are compared with the established baseline performance parameters. An interface may be generated for a client user associated with the commercial platform to represent one or more of the performance comparisons, and optionally provide alerts to underperformance or suggest future actions based on predicted performance.

17 Claims, 5 Drawing Sheets

SYSTEM AND METHOD OF SOCIAL COMMERCE ANALYTICS FOR SOCIAL NETWORKING DATA AND RELATED TRANSACTIONAL DATA

CROSS-REFERENCES TO RELATED APPLICATIONS

This application claims benefit of the following patent application(s) which is/are hereby incorporated by reference: U.S. Provisional Application No. 61/528,809, dated Aug. 30, 2011.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to a system and associated methods for analyzing and evaluating social media campaigns. More particularly, this invention relates to a host platform and associated methods for aggregating data from one or more social networks around a profile or page and transactional data from associated E-commerce storefronts, and analyzing the aggregated data for valuation and other relevant user information.

As social networking has evolved in recent years, business entities have increasingly broadened their definitions of online advertising to include social media campaigns. Such campaigns are typically designed to extend far beyond the conventional banner ads, and may instead seek to provide a creative experience which is customized to generate word-of-mouth throughout target demographics or otherwise utilize interactive, motivating and "community-building" features which are inherent to social media.

However, the use of social commerce analytics to make such social media campaigns function properly or otherwise maximize their benefit is relatively new. As a result, companies struggle to properly monetize their campaigns, whether in making initial decisions on how to allocate their resources, or in gauging the strength and success of their campaigns and making corrective actions to ensure optimal future campaign performance.

For example, a company or merchant may find it particularly advantageous to integrate with social media channels that generate the appropriate level and type of feedback for its products, services, values, etc. Identifying a target online demographic may require not only identifying a target consumer for your particular goods and services and a demographic associated with a particular social media channel, but observing the interaction of visitors over time and tracking associated performance variables to evaluate individual campaigns. Most current analytical platforms either provide direct feedback as to a number of views, links, orders, recommendations, etc., or provide indirect feedback as to the ability of an advertisement to generate traffic on the commercial site, without substantive analysis of (for example) the campaign's impact relative to other campaigns or across a number of channels.

It would therefore be desirable to provide a social commerce analytics platform capable of generating feedback for a user that includes visitor scoring across a spectrum of parameters customized to the particular client/merchant, or otherwise selected and modified over time to maximize the benefit of associated social media campaigns to the client.

BRIEF SUMMARY OF THE INVENTION

Briefly stated, a host system in accordance with the present invention utilizes social commerce analytics and aggregates the data from social networks around a single profile or page, such as friends, followers, "likes", "comments" and "shares" as well as the transactional data from e-commerce storefronts (connected to that same profile or page), such as cart conversion, best selling products and total revenue. The aggregated data is used to present connections between social networking activity and e-commerce transactions, to the owner or authorized manager of the profile or page, as well as to visualize the value of the profile or page's social graph in a fan value spectrum.

Various algorithms may be used to calculate key metrics such as for example but without limitation an average amount of revenue per fan, fan status by revenue, and/or value of social graph.

In an embodiment, a host system of the present invention includes a computer-readable medium having instructions residing thereon, the instructions executable by a processor to perform a method for social commerce analytics and optimization. A host server collects and stores online visitor traffic data from social media platforms and from commercial platforms linked to social media campaigns operating on the social media platforms. Algorithms are executed to establish baseline performance parameters for the commercial platforms based on the stored data, and visitors of the social media campaigns and commercial platforms are identified and scored based on predetermined scoring metrics. The scores are aggregated with respect to the social media campaigns and/or the commercial platforms, and actual performances based on the aggregated scores are compared with the established baseline performance parameters. An interface may be generated for a client user associated with the commercial platform to represent one or more of the performance comparisons, and optionally provide alerts to underperformance or suggest future actions based on predicted performance.

In one aspect of the present invention, the host system tracks all visitors, anonymously, from impressions of a user interface (i.e., storefronts) associated with the host platform through the use of data collection media as previous known in the art, such as for example cookies.

In another aspect, the host system captures engagement activities from those anonymously tracked visitors such as for example 'listened to song', 'watched video', 'clicked link.'

In another aspect, the host system connects the data collected from anonymous visitor tracking to authorized registered accounts through the host platform.

In another aspect, the host system measures the conversion funnel from anonymous impression through transaction.

In another aspect, the host system integrates with social networks such as for example Facebook, Twitter and MySpace to connect accounts registered with the host platform with accounts that "like" or "follow" brands when proper permissions have been granted to the host system by the account holder.

In another aspect, the host system creates a spectrum of fan engagement ("like" to "buy") with quantity and value with a unique combination of data which may include but is not limited to anonymous visitor tracking, host account tracking, and data from Social Network graphs on host account holders.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Referring generally to FIGS. 1-5, various systems and methods are described herein for providing social commerce analytics and optimization in accordance with the present invention. Generally stated, the systems and methods seek to obtain data from a plurality of online sources and deploy social commerce analytics solutions to identify or otherwise report commercial opportunities to an e-commerce platform manager with respect to associated social media campaigns. Where the various figures may describe embodiments sharing various common elements and features with other embodiments, similar elements and features are given the same reference numerals and redundant description thereof may be omitted below.

Figure 1:
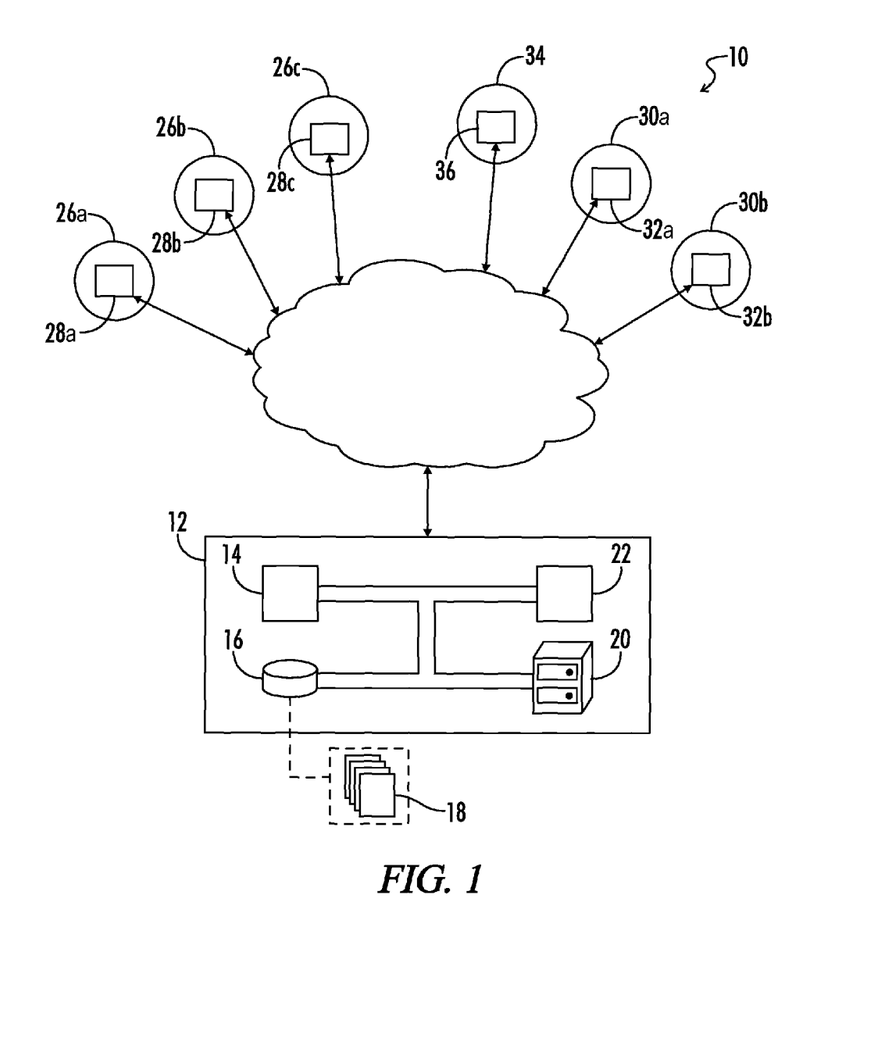
FIG. 1 is a block diagram representing an embodiment of a hosted system in accordance with the present invention.

Referring first to FIG. 1, in an embodiment of the present invention a social commerce analytics system 10 is embodied by or within either of a central hosted server 12 or a plurality of servers 12 functionally linked and collectively defining a distributed host network (not shown). The server 12 as represented in FIG. 1 further includes a processor 14, a computer-readable memory medium 16, a database 20 and an I/O platform or module 22 which may typically include a user interface generated by the program instructions in accordance with methods or steps described in greater detail below.

The term "computer-readable memory medium" as used herein may refer to any non-transitory medium 16 alone or as one of a plurality of non-transitory memory media 16 within which is embodied a computer program product 18 that includes processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" as generally used herein may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The term "processor" as used herein may refer to at least general-purpose or specific-purpose processing devices and/or logic as may be understood by one of skill in the art, including but not limited to single- or multithreading processors, central processors, parent processors, graphical processors, media processors, and the like.

The host server 12 may be accessible by or otherwise linked to various external and third party platforms via a communications network 24 and in accordance with these links is effective to collect, obtain, receive, transmit and/or share data using various communications protocols as are well known in the art. The term "communications network" 24 as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces as are known in the art.

The term "platform" as used herein may typically refer to a website, network, or alternative but equivalent interfaces for supporting multimedia interactivity consistent with the described features of the present invention.

A "client" as referred to herein may refer to a merchant, e-commerce site manager, administrator or otherwise interested entity on whose behalf the systems and methods of the present invention perform the social commerce analytics. Access by the client to the results of the systems and methods described herein may be provided through a dashboard and various screens of data and graphs in accordance with security measures such as user login and passwords or other equivalent means as are well known in the art and otherwise not described herein.

The term "online traffic data" as used herein may unless otherwise stated be understood in accordance with its plain meaning to those of skill in the art, but may generally for the purposes of the systems and methods of the present invention be centered on information regarding consumers or potential consumers of the client platforms and associated storefronts. One example of such data may include web traffic data collected from web servers, third party analytics systems and IP intelligence systems, and which can provide geographic information, information about the user making the web request, demographic information, session length, and other distinguishable data regarding the web request. Another example of such data may be that connected to an email address, or the encrypted hash of an email address, from a third party data provider or collected directly through the host system, that provides personally identifying information, transactional data, demographic data, interest data and other data uniquely connected to the email address. Another example may include data collected from social networks that employ a social graph, and enable, by permission, the data of that social graph to be collected on a member of the social network. Yet another example may be data collected from e-commerce transactions made through the host system.

Referring again to FIG. 1, examples of platforms which are typically linked to the host server 12 in accordance with methods of the present invention may include social networking platforms 26, client platforms 30, and third party platforms 34. In a typical embodiment, one or more of the social networking platforms 26 may generally include or provide access to a social media campaign 28 associated with a client of the system 10, and the host server 12 may be programmed to collect, receive or otherwise obtain information from the social networking platform 26 regarding online traffic and/or related visitor activity with respect to the social media campaign 28 or even more generally with regards to the platform 26 for the purposes of comparison.

Likewise, one or more of the client platforms 30 may generally include a storefront 32 associated with the client managing or otherwise operating the campaigns described above, and the host server 12 may be programmed to collect, receive or otherwise obtain information from the client platform 30 regarding online traffic and/or related visitor activity with respect to the storefront 32 or even more generally with regards to the platform 30 for the purposes of comparison.

The term "storefront" as used herein may typically refer to an interface generated in association with the underlying platform which provides for or otherwise facilitates the selection, purchase, transfer, etc., of goods or services offered by the client. In various embodiments the client platform 30 may be associated with a client entity that does not commercially offer goods or services, wherein the storefront 32 more generally refers to an interface or portal for interacting with visitors, obtaining feedback, soliciting donations, or the like.

In certain embodiments a third party platform 34 having an associated portal or storefront 36 may be further linked to the host server 12 or otherwise integrated with the system 10 for the purpose of providing comparison data, for example with respect to the online traffic on the social networking platforms or with respect to the commercial traffic on the storefronts associated with the client. In some cases, the third party platform 34 with respect to one client may in fact be a second client of the system 10 wherein the first client maintains one or more third party platforms 34 with respect to the second.

Figure 2:
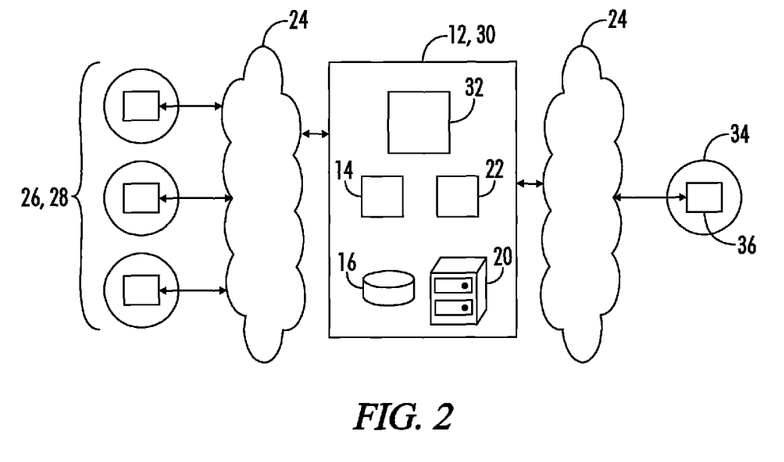
FIG. 2 is a block diagram representing another embodiment of a hosted system in accordance with the present invention.

Referring now to FIG. 2, in another embodiment the client platform 30 and the host server 12 of the system 10 may be the same entity within the scope of the present invention. The social networking platforms 26 and third party platforms 34 are still linked to the server 12 and to the storefronts 32 via the communications network 24, but it may be understood that certain steps would be redundant in such configurations, including but not limited to the need to transmit and receive data between the client platforms and the host server of FIG. 1.

Further within the scope of the present invention, it may be anticipated that the host server 12 in association with one client platform 30 (as represented in FIG. 2) may further function to perform methods in accordance with the present invention for or on behalf of other client platforms 30 (as represented in FIG. 1).

Figure 3:
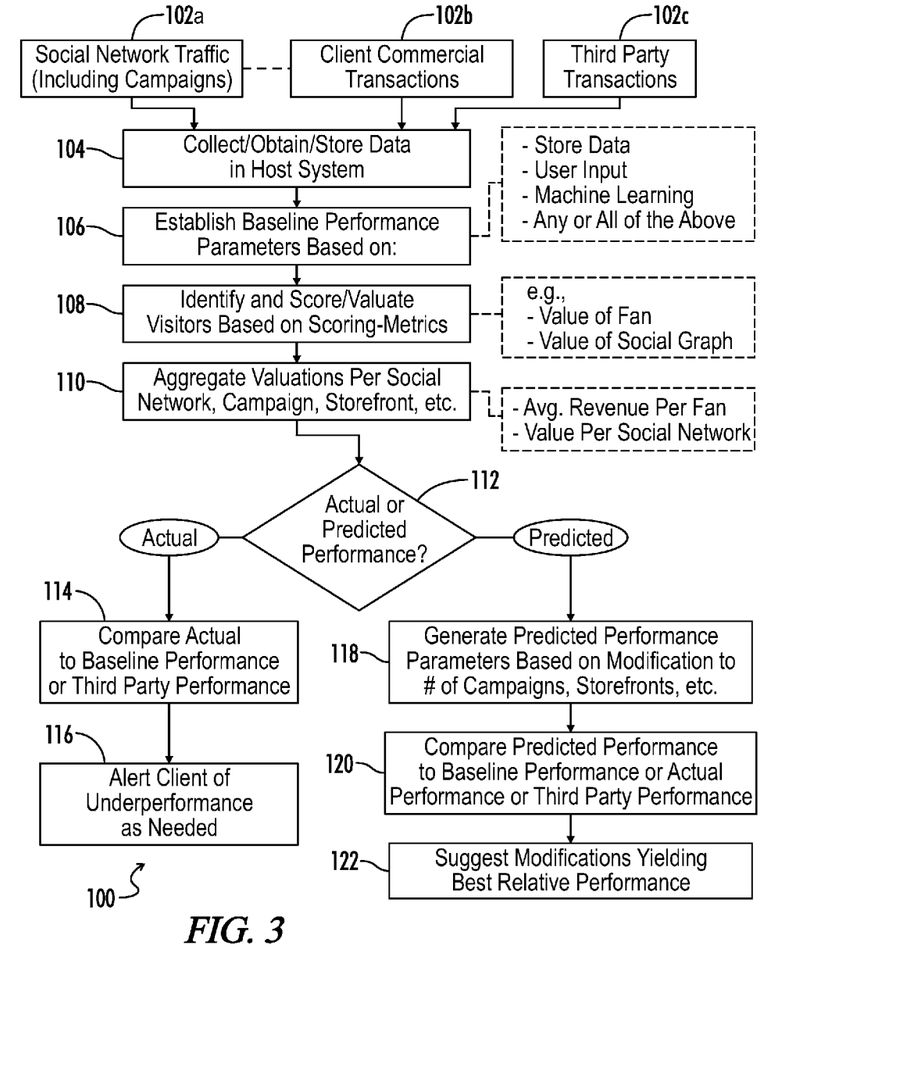
FIG. 3 is a flowchart representing an exemplary method in accordance with the present invention.

Referring now to FIG. 3, a social commerce analytics method 100 may now be described in accordance with an embodiment of the present invention. For illustrative purposes, the various steps of the method 100 may refer to the system 10 as represented in FIG. 1, but certain steps may be considered as redundant in view of alternative system configurations or even optional unless otherwise stated. Further, the steps of the method 100 as represented in FIG. 3 are not intended as limiting on the actual chronology of their performance, unless otherwise stated or logically required.

As a first step (102) of the method 100 or alternatively as a precursor to the steps as executed by a host system 10 in accordance with the present invention, online activity is conducted by a plurality of visitors and coincidentally or subsequently monitored or recorded with respect to one or more social networking platforms (102a), client platforms (102b) and third party platforms (102c).

The online traffic data from the respective social networking platforms which is relevant to the method 100 may include without limitation general online traffic data, activity data (user interaction) with respect to one or more social media campaigns related to the client and operating via the social networking platform, activity data with respect to other campaigns which may be relevant or otherwise relate to the client campaign, activity data by consumers associated with the client platform or other visitors determined to be associated with such consumers, and the like. Examples of data gathering may include active steps on the part of the host system, such as for example via the use of code snippets, cookies or other data collection media operating within the social media campaign interface or elsewhere within the social networking platform, and may involve for example anonymous visitor tracking, data scraping, etc. Alternatively, examples of data gathering may be more passive, such as for example and without limitation by directly requesting data from the visitor, requesting data from the platform administrator, obtaining permission to review or download all or portions of a social graph associated with an individual visitor or related member spectrum data associated with the platform generally. The system may accordingly track visitor engagement actions across the various platforms including for example but without limitation the playing of video or audio media associated with the campaigns, "sharing" a campaign or storefront with other users of the platform, etc.

The online traffic data from the respective client (typically merchant or otherwise e-commerce) platforms which is relevant to the method 100 may include without limitation general online traffic data, and activity data (e.g., user/consumer interaction) with respect to one or more storefronts related to the client and operating via the client platform as derived from individual visitors or groups of visitors, and which may be broken down further with respect to consumers, visitors who fail to make a purchase, repeat visitors who fail to make purchases, repeat consumers, "friends" or the like with respect to prior consumers, etc. Other online traffic data of typical relevance to the method 100 includes transactional details specific to a visitor such as for example adding products or services to a virtual shopping cart for purchase, dates and amounts of purchases, means for discovering or otherwise navigating to the storefront, etc., or general storefront data regarding overall revenues, traffic volume, revenues per data point (e.g., per visitor, per day, per product sold, etc.) and the like.

The online traffic data from the respective third party platforms which is relevant to the method 100 may typically be similar in content to that of the client platforms, as their primary importance to the method is for direct comparison in steps which will be further described below.

The online traffic data and other relevant data as described or alluded to above are collected or otherwise obtained and subsequently stored in the server for use by the system algorithms or for basic reporting and comparison purposes (step 104). Data may be remotely sourced from for example electronic files, databases, as streamed in substantially real-time, etc., or may be received at the host server via bundled data transmissions from external parties (e.g., clients, social networking administrators, third party contributors, online visitors, members of the host system, etc.). An exemplary analytics data flow is further represented in FIG. 5, wherein data is obtained electronically by permission, aggregated and analyzed, etc., as further described in accordance with the method 100.

One such exemplary system algorithm may be used (step 106) to establish a baseline performance standard for more generally measuring or comparing actual future commercial/transactional performance with respect to the storefronts/platforms. In various embodiments, a variety of for example organic, third-party, raw, processed data sources may without limitation be leveraged by system algorithms to construct a suite of baseline parameters and methods which either alone or collectively may define a baseline scoring system. The number and types of parameters defining a scoring baseline may grow over time, and may be combined in any order as needed to construct thresholds which may, but not necessarily, be customized post facto based on the candidate performance data being evaluated. Exemplary parameters may be without limitation temporal, categorical, single integers, lists of integers, real numbers, lists of real numbers, categorical lists, probabilities, etc., and may relate to any type or number of relevant data points, commercial or otherwise, as desired by a particular client.

The generation of parameters for inclusion into the baseline scoring system may occur based on information defined by (for example) an analytics manager (using predetermined criteria and stored historical data), a client user of the system (user-defined criteria), patterns constructed over time through machine learning (determined and performance-defined criteria), or some combination of the same. Some weighting in parameter generation may further evolve over time, where for example user-defined criteria may be more heavily relied upon initially, but is gradually reduced in weight relative to performance-defined criteria as the algorithm may more reliably base the parameters on a broader spectrum of relevant input data.

Baseline performance thresholds may be established by systems, algorithms, program modules, etc., of the present invention with respect to individual campaigns, channels and/or storefronts, or aggregations of any or all of the same, further with respect to for example commercial performance, traffic performance, and other related and derived data points. In an exemplary process, a particular client may set up multiple storefronts, each containing multiple products, which operate within or are otherwise linked to a number of campaigns that are offered into various social (or non-social) media channels. Baseline thresholds may be set up for each of the campaigns (relating to for example raw online traffic, levels of interactivity, conversion percentages with respect to the linked storefronts), each of the storefronts (relating to for example revenue, purchases relative to the number of visitors, raw online traffic), individual products, or an aggregate of the above which parameters may be defined largely by the number of campaigns or storefronts being provided in the first place. The particular campaigns and storefronts may vary in their individual baseline parameters with respect to for example the number of expected online visitors or prior patterns in translating online traffic to actual revenue.

System algorithms and methods of the present invention may further generate actual performance scores for comparison against the baseline parameters (step 108) by identifying and scoring/evaluating visitors based on a number of scoring metrics.

In an embodiment, visitors may be identified and labeled according to a "visitor engagement spectrum" or "fan engagement spectrum" designed around or otherwise based upon specific activities tracked across all or a respective portion of the collected/aggregated dataset, and algorithms are utilized to map the collected/obtained data to the fan spectrum for each associated channel, brand, etc. In one particular example, the spectrum may evaluate "fans" and/or followers of a social networking page (campaign) into a number of defined sections such as the following:

A "Super Fan" may be designated as a member of the social network who is a fan of the campaign or storefront and has purchased multiple times from the storefront, or has purchased once from the storefront and has shared an offer to another member of the social network who has subsequently made a purchase from the storefront.

A "Purchasing Fan" may be designated as a member of the social network who has purchased from the storefront at any time in the past.

An "Advocate Fan" may be a member of the social network who has shared an offer to another member of the social network who subsequently made a purchase from the storefront.

An "Engaged Fan" may be a member of the social network who is a fan of the campaign or storefront and has shared an offer to another member of the social network.

A "Fan" may be a member of the social network who is a fan of the campaign or storefront generally.

A "Potential Fan" may be a member of the social network who has one degree of separation from the campaign or storefront.

Figure 4:
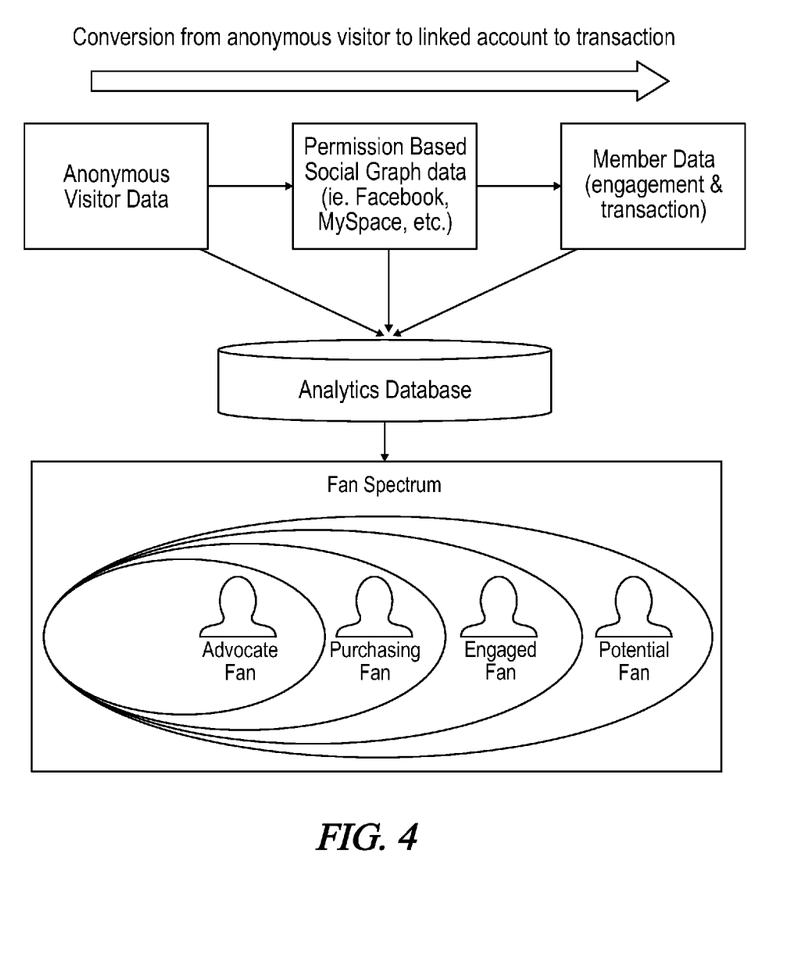
FIG. 4 is a flowchart representing an exemplary conversion process from anonymous visitor to linked account to transaction via a commercial platform in accordance with the present invention.
Figure 5:
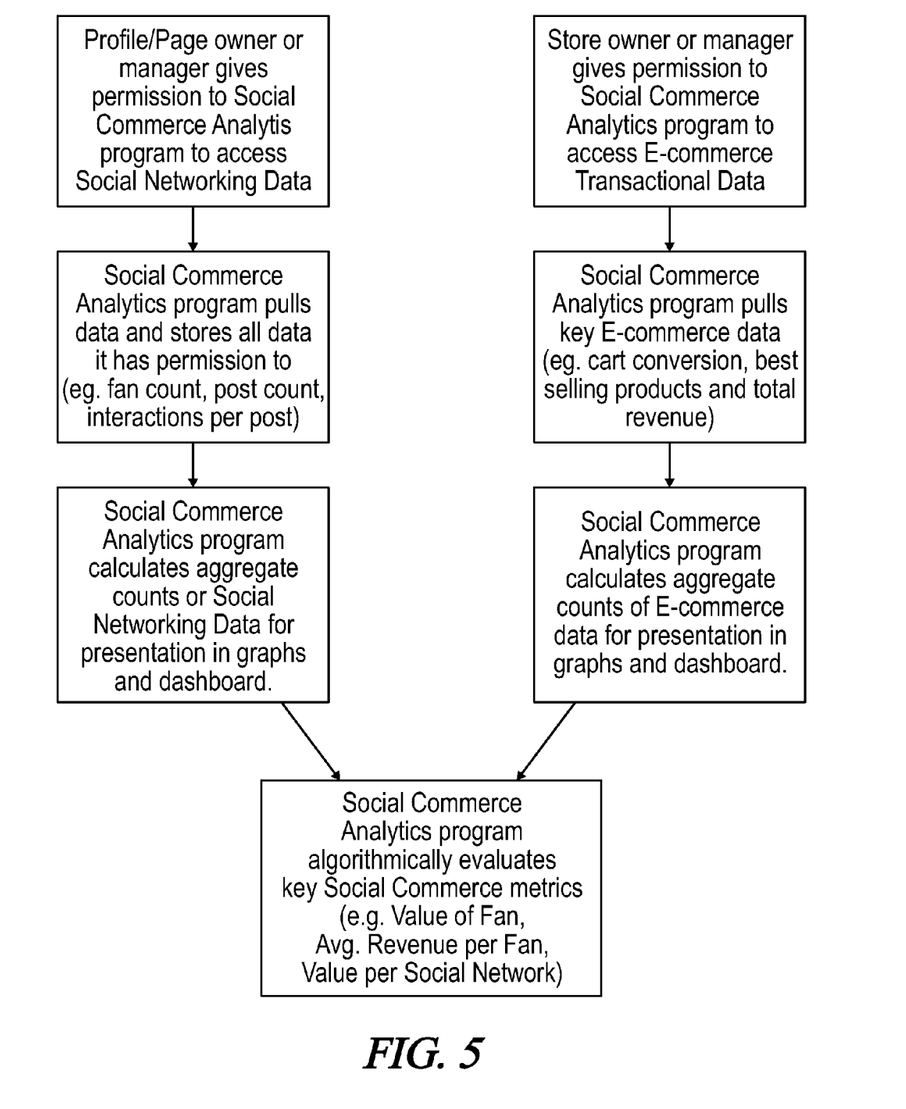
FIG. 5 is a flowchart representing an exemplary analytics data flow in accordance with the present invention.

FIG. 4 represents an exemplary identification process, wherein an initially anonymous visitor is typically redefined or reevaluated in the fan spectrum at the bottom of the diagram after providing permission to the host system to access social graph data, and subsequently engaging and conducting transactions via the commercial storefront.

Returning to the scoring/valuation portion of step 108, through a weighting system of the various data points, for example with the heaviest weight applied to transactions and the lightest weight applied to anonymous traffic, and/or with the weight impacted by recentness (e.g., the most recent purchaser gets a higher weight than the least recent purchaser), the system may thereby give a score to the visitor with respect to all other visitors. The score can be applied to all of the people being measured in a client's account on the host system, or a subset (down to one person).

Data may be measured from any one of a plurality of perspectives in accordance with various embodiments of the present invention. For example, the data may be measured according to the "channel" or location where the web traffic occurred, where the email address was collected, where the social graph data was collected, or where the transaction took place. Data may be measured in accordance with a person or a collection of people grouped by common metadata. Data may further be measured according to an offer made through the system to the people in an effort to collect an email address or social graph permissions or a transaction. Data may further be aggregated together in any and all combinations including sources listed above as well as various others without limitation and within the scope of the present invention, to measure other data and/or be measured by other data.

An exemplary scoring process may be described as follows. The existence of traffic data gets a base score of 10. The existence of email address data gets a base score of 30. The existence (and permission to collect or obtain) of social graph data gets a base score of 60. The existence of transactional data gets a base score of 100.

A client accesses the system to review activity as collected, collated, determined, scored, etc., by the host system on their behalf. Upon looking at the view of a particular offer, they see that a person viewed the offer through Facebook. Facebook in this particular example may have been applied a channel weight of 2× the normal (perhaps because historically Facebook has generated twice as much activity for them as other channels). As a result, this person's traffic score is 20 (2×10).

The person did not (or could not) give permission regarding their social graph data, but they did make a purchase. For that, the person gets both the email address base score and the transactional base score, equaling 130 (30+100).

Finally, the exemplary transaction happened yesterday, so the transactional base score is weighted upwards by 50% to 150 (100×1.5), bringing the total social commerce score for this user to 170 (20 for traffic+30 for email+150 for transactions).

It may be understood that various alternative scoring metrics, weighting algorithms, and valuation representations may be optimal or preferred across a range of commercial applications, and the above process is intended as being exemplary only.

Having identified and scored the various individual visitors/fans, the method may continue by aggregating valuations with respect to for example respective social networking platforms, campaigns, storefronts, products, etc. (step 110).

In various embodiments, the system may in accordance with client-defined preferences or parameters then provide valuation representations based on the baseline parameters, actual performance, predicted performance, third party performance, or any combination of the same. As represented in FIG. 3 (step 112), the client may generally elect to display comparisons of the baseline parameters or third party performance data with either of the actual performance or a predicted performance (or both-not shown but as may be implied).

Where the client has selected actual performance comparisons, or where such comparisons are even available (this would not be the case initially of course as the campaigns have not yet seen any online traffic), the system may generate and subsequently display or otherwise provide access to comparisons of actual performance data with respect to any or all of the baseline performance parameters, historical performance data for the client, and third party performance data (step 114). The actual performance data to be used for comparison may be automatically selected in view of the available stored data or may be selectable by the client, and in certain embodiments in accordance with the present invention an interface (e.g., dashboard) may be generated by the system in accordance with predetermined client criteria and auto-populated to represent respective valuations and comparisons. The system may indicate to or otherwise alert the client of areas of underperformance where such comparisons result in actual performance falling below the relevant baseline performance thresholds (step 116). Such indications may include for example and without limitation passively generating the determined result, may include color-coding, changing the order of presentation or otherwise highlighting the areas of underperformance, or may alternatively include a more proactive approach such as generating a pop-up screen or box when the client logs into the system. In certain embodiments the system may be configured to rank parameters with regards to their relative importance to the particular e-commerce (or other) objectives of the client, those which can be excluded, etc. The system may in various alternative embodiments or as selectable and supplemental options to the above examples score the comparisons by various other criteria for the purpose of suggesting improvements in performance, albeit in a more passive manner. Given these under-performance alerts, the campaign manager (client) can respond within the framework and take corrective action for the purpose of facilitating optimal campaign performance going forward.

Where the client has selected predicted performance comparisons, or in an initial condition where some actual comparisons are not available as some or all of the campaigns have not yet seen any online traffic, the system may generate predicted performance parameters based on initial settings or modifications to the existing parameters such as for example the number of campaigns, number of storefronts, transferring one or more campaigns to different channels, etc. (step 118). The system further compares the predicted performance data to any or all of the baseline performance parameters, actual performance data, third party performance data, etc. (step 120), and then may (in step 122) suggest or otherwise recommend modifications or courses of action to increase performance in relation to any or all parameters with the ultimate goal of for example optimizing performance within the distributed social commerce environment.

In certain embodiments two or more of the above steps may be combined into a single step where for example a program module is executed to internally generate one or more virtual modifications, test predicted results of the virtual modifications, and subsequently suggest any one or more virtual modifications which are determined by the system to generate potential improvements in performance with respect to current actual performance, third party performance and/or baseline parameters.

Alternatively, the system may include a step (not shown) of receiving one or more potential modifications and a request from the client to predict their performance against the current actual performance, third party performance, and/or baseline parameters, at which time the system may be programmed or configured to generate, test and score predicted results for the provided modifications accordingly.

The previous detailed description has been provided for the purposes of illustration and description. Thus, although there have been described particular embodiments of the present invention of a new and useful "System and Method of Social Commerce Analytics for Social Networking Data and Related Transactional Data," it is not intended that such references be construed as limitations upon the scope of this invention except as set forth in the following claims.

What is claimed is:

1. A non-transitory computer program product within a computer-readable storage medium and comprising program instructions which are executable by a processor to direct the performance of:

collecting online traffic data from one or more social media platforms via a communications network and storing said data in a hosted server;

collecting online traffic data via the communications network from one or more destination platforms further comprising a storefront associated with a client and linked to social media campaigns operating on one or more of the social media platforms, and storing said data in the hosted server;

establishing baseline performance parameters for future commercial or transactional performance by the storefronts associated with the client based on the stored online traffic data;

identifying and evaluating visitors of the social media campaigns and the destination platforms based on predetermined scoring metrics;

aggregating said valuations with respect to each of said social media platforms, social media campaigns and destination platforms;

comparing actual performances based on said aggregated valuations with the established baseline performance parameters; and generating on a display device associated with the client a user interface comprising representations of said comparisons.

2. The computer program product of claim 1, the instructions executable to generate the user interface further comprising alerts of relative underperformance with respect to the baseline performance parameters.

3. The computer program product of claim 1, the instructions further executable to calculate predicted performance parameters associated with one or more social media campaigns based on the stored online traffic data, and compare the predicted performance parameters with the established baseline performance parameters.

4. The computer program product of claim 3, the instructions further executable to generate on the display device associated with the client a list of one or more suggested improvements based on the comparison of the predicted performance parameters with the baseline performance parameters.

5. The computer program product of claim 1, wherein collecting online traffic data comprises continuously monitoring visitor activity across the associated platform.

6. The computer program product of claim 1, wherein collecting online traffic data comprises obtaining access to member data stored in a database for the associated platform.

7. The computer program product of claim 1, wherein collecting online traffic data comprises obtaining permission to access social graph data associated with individual users.

8. The computer program product of claim 1, the destination platforms comprising commercial platforms associated with a merchant client, the baseline and actual performance parameters further comprising commercial orders and associated revenues.

9. The computer program product of claim 8, the predetermined scoring metrics comprising proximal relationships between commercial platform activity and social media campaign activity with respect to individual visitors.

10. A non-transitory computer program product within a computer-readable storage medium and comprising program instructions which are executable by a processor to direct the performance of:

obtaining online traffic data via a communications network and storing the data in a hosted server, the online traffic data comprising
  commercial data from a commercial website associated with a client user,
  social networking data from one or more social media websites having a social media campaign associated with the client user and linked to the commercial website, and
  one or more third party websites;

establishing baseline performance parameters for future commercial performance associated with the commercial website based on the number of campaigns and the stored online traffic data;

identifying and evaluating visitors of the social media campaigns and the commercial website based on predetermined scoring metrics;

aggregating said valuations with respect to each of said social media websites, social media campaigns and commercial website;

comparing actual performances based on said aggregated valuations with the established baseline performance parameters;

comparing the actual performances with equivalent performances derived from the third party website traffic data; and generating on a display device associated with the client a user interface comprising representations of said comparisons.

11. The computer program product of claim 10, the instructions executable to generate the user interface further comprising alerts of relative underperformance with respect to the baseline performance parameters.

12. The computer program product of claim 10, the instructions further executable to calculate predicted performance parameters for the commercial website based on the number of campaigns and the stored online traffic data, and compare the predicted performance parameters with the established baseline performance parameters.

13. The computer program product of claim 12, the instructions further executable to generate on the display device associated with the client a list of one or more suggested improvements based on the comparison of the predicted performance parameters with the baseline performance parameters.

14. The computer program product of claim 10, wherein obtaining online traffic data comprises continuously monitoring visitor activity across the associated websites and collecting associated data.

15. The computer program product of claim 10, wherein obtaining online traffic data comprises obtaining access to member data stored in a database for the associated website.

16. The computer program product of claim 10, wherein obtaining online traffic data comprises obtaining permission to access social graph data associated with individual users.

17. The computer program product of claim 10, the baseline and actual performance parameters for the commercial website further comprising commercial orders and associated revenues, the predetermined scoring metrics comprising proximal relationships between commercial website activity and social media campaign activity with respect to individual visitors.

* * * * *